United States Patent
Le Tourneur et al.

(10) Patent No.: US 7,636,435 B2
(45) Date of Patent: Dec. 22, 2009

(54) DEVICE AND METHOD FOR PROCESSING AUDIO SIGNALS AND TELECOMMUNICATION SET EQUIPPED WITH SUCH A PROCESSING DEVICE

(75) Inventors: Grégoire Le Tourneur, St Quay-Perros (FR); David Deleam, Perros Guirec (FR)

(73) Assignee: France Telecom, Paris (FR)

( * ) Notice: Subject to any disclaimer, the term of this patent is extended or adjusted under 35 U.S.C. 154(b) by 720 days.

(21) Appl. No.: 11/267,560

(22) Filed: Nov. 4, 2005

(65) Prior Publication Data
US 2006/0126823 A1    Jun. 15, 2006

(30) Foreign Application Priority Data
Nov. 4, 2004   (FR) .................................... 04 11761

(51) Int. Cl.
*H04M 9/08* (2006.01)
(52) U.S. Cl. .................................. 379/406.07; 379/395
(58) Field of Classification Search ............ 379/406.07, 379/395
See application file for complete search history.

(56) References Cited

U.S. PATENT DOCUMENTS

| | | | |
|---|---|---|---|
| 5,644,635 A | 7/1997 | Armbruster | 379/390 |
| 7,142,665 B2 * | 11/2006 | Barron et al. | 379/406.08 |
| 2003/0076948 A1 | 4/2003 | Nichimura | 379/406.01 |

OTHER PUBLICATIONS

Preliminary Examination Report prepared by the European Patent Office in the corresponding French application (2 pgs).

* cited by examiner

*Primary Examiner*—Alexander Jamal
(74) *Attorney, Agent, or Firm*—Drinker Biddle & Reath LLP

(57) ABSTRACT

This device for processing audio signals for telecommunication equipment comprises automatic gain control means (18) acting on the level of the received audio signal (Sr) by amplifying and attenuating the signal as a function of the level of the received signal and echo cancelling means (22).

The automatic gain control means (18) comprise amplification means (19-$b$) and attenuation means (19-$a$) for separately amplifying and attenuating the received signal downstream and upstream of the echo cancelling means (22), when considering the propagation direction of the received signal.

7 Claims, 2 Drawing Sheets

DEVICE AND METHOD FOR PROCESSING AUDIO SIGNALS AND TELECOMMUNICATION SET EQUIPPED WITH SUCH A PROCESSING DEVICE

RELATED APPLICATIONS

The subject application claims the priority of French Application No.: 04 11761, filed on 04 Nov. 2004.

FIELD OF INVENTION

The invention relates to the digital processing of audio signals, and more particularly concerns the echo cancelling and automatic gain control in telecommunication sets.

One particularly beneficial application of such a device and such a method concerns the electrical or acoustic echo cancelling and the automatic gain control in a telecommunication set or a system operating according to the Internet protocol, provided with a gateway to a switched telephone network. Nevertheless, the invention may also be applied to the electrical or acoustic echo cancelling and the automatic gain control in a set offering a hands free function, especially in a telecommunication set of the mobile type.

BACKGROUND OF THE INVENTION

By way of explanation, the electrical echo due to the two-wire/four-wire line transformers of the remote set, which is used to process the incident signals in order to make them compatible with the telephone line, perturbs the communications by sending over the line some of the signals received by the remote set. Likewise, in the case of a telephone set, an acoustic echo appears when the signal emitted by the loudspeaker, which corresponds to a signal spoken by the remote speaker, is picked up by the microphone.

For the user, these echoes then lead to the signal being reproduced in the earpiece with an offset relative to the transmission time. Such an offset becomes relatively problematic beyond the time when the delay in the system becomes large, i.e. for example more than 50 ms. The echo is generally reduced, or even cancelled, by fitting the sets with AEC (acoustic echo canceller) or EEC (electrical echo canceller) echo cancelling devices. Furthermore, access to a service or generally the establishment of communication between remote equipment may take place in various ways, i.e. by using the IP protocol, by using a switched telephone network, a GSM network, etc. These access modes may generate level variations in the signal delivered to the earpiece. This level variation may also be due to the speaker moving away from or closer to the microphone, as well as the natural variety of speech volume between individuals. However, the sound recording system has a finite dynamic range associated with the presence of an analogue-digital converter within the digital processing system fitted to the set. It is therefore necessary to keep the signals received from remote speakers within a certain range.

To this end, audio signal processing devices conventionally use an automatic gain control device AGC in order to keep the level of the output signal constant over a predetermined working range. The automatic gain control is based on using the energy of the signals and, by comparison with thresholds, employs either an amplification strategy or a strategy of attenuating the signal.

Such devices operate quite effectively. They nevertheless pose major problems when they are used in conjunction with an acoustic or electrical echo canceller. In fact, the automatic gain control means may be arranged either upstream or downstream of the echo cancelling means, considering the path of the received signal.

In general, when the automatic gain control means are arranged upstream of the echo cancelling means, it is very difficult to differentiate the echo reliably from the remote signal. In this case, operation may be perturbed depending on the orders of magnitude of the signals in the system.

In this case, concerning the electrical echo, although the automatic gain control means are liable to reduce the echo if it is large, especially in the case of an unmatched, "open" or "short-circuited" line, or if the remote signal is more than the maximum threshold of the automatic gain control means, they nevertheless have a certain number of drawbacks. This is because the automatic gain control means are driven both by the received signal coming from remote equipment and by the echo. They may therefore be perturbed by taking the echo signal into account. There is furthermore a risk of attenuating the signal from the remote equipment if the echo is large or, conversely, of amplifying the echo if this signal is weak. There is also a risk of amplifying the echo if it is weak. Lastly, the automatic gain control means which, by their nature, incorporate a nonlinear function, perturb the operation of the echo canceller which generally consists of an adaptive filter.

When the automatic gain control means are arranged downstream of the echo cancelling means, the echo signal is no longer capable of perturbing the automatic gain control, in so far as the signal coming from the remote equipment is essentially taken into account.

Furthermore, it does not perturb the echo canceller in so far as the nonlinearity lies downstream. Nevertheless, the automatic gain control means will then be perturbed by the processing operations carried out within the echo canceller, which also introduce a nonlinearity. Furthermore, the automatic gain control means are no longer capable of attenuating the echo.

OBJECTS OF THE INVENTION

In view of this, it is an object of the invention to provide a device for digitally processing an audio signal, in which it is possible to combine automatic gain control means and echo cancelling means within the same equipment, while eliminating the drawbacks associated with the presence of one of these means for echo cancelling and automatic gain control in the operation of the other means.

SUMMARY OF THE INVENTION

The invention therefore relates to a device for processing audio signals for telecommunication equipment, comprising automatic gain control means acting on the level of the received audio signal by amplifying and attenuating the signal as a function of the level of the received signal and echo cancelling means.

According to a general characteristic of the invention, the automatic gain control means comprise amplification means and attenuation means for separately amplifying and attenuating the received signal downstream and upstream of the echo cancelling means, when considering the propagation direction of the received signal.

Preferably, the means for amplifying and the means for attenuating the received signal respectively act downstream and upstream of the echo cancelling means.

According to another characteristic of the invention, the automatic gain control means comprise means for calculating an overall amplification or attenuation coefficient as a function of the level of the received signal, which are respectively intended to constitute an amplification coefficient for the amplification means or an attenuation coefficient for the attenuation means, such that the product of the coefficients respectively applied to the amplification means and the attenuation means is equal to the overall coefficient.

In this case, in one embodiment in particular, the amplification means and the attenuation means each comprise a multiplier respectively placed downstream and upstream of the echo cancelling means and receiving the amplification coefficient and the attenuation coefficient as input, respectively.

Advantageously, the device furthermore comprises means for attenuating the signal transmitted from the telecommunication equipment by a level corresponding to the attenuation generated in the received signal by the attenuation means.

For example, the echo cancelling means comprise means for estimating the echo and means for subtracting the estimated echo from the received signal.

The invention also relates to a telecommunication set, characterized in that it comprises a device for processing acoustic signals as defined above.

According to yet another object, the invention relates to a method for processing an audio signal for telecommunication equipment by automatically controlling the gain of a received audio signal by amplifying or attenuating the signal as a function of the level of the received signal and cancelling the echo, characterized in that the signal is attenuated and amplified separately before and after the echo cancelling.

In one advantageous embodiment, the signal is attenuated and amplified respectively before and after the echo cancelling.

In one embodiment of this method, the level of a transmitted audio signal is furthermore attenuated by a level corresponding to the attenuation level of the signal before the echo cancelling.

BRIEF DESCRIPTION OF THE DRAWINGS

Other objects, characteristics and advantages of the invention will become apparent on reading the following description, which is given solely by way of non-limiting example and refers to the appended drawings, in which.

DETAILED DESCRIPTION

Figure 1:
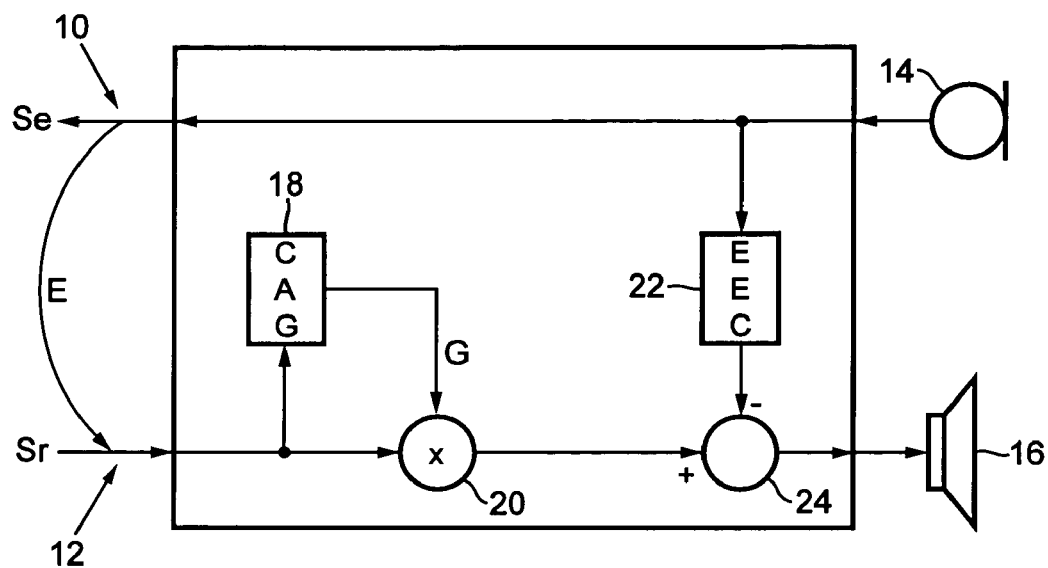
FIG. 1 illustrates the structure of a device for processing audio signals according to the prior art, in a first embodiment.

FIG. 1 represents an example of a device for digitally processing an audio signal according to the prior art, which is provided with automatic gain control means and echo attenuating means, and for which the transfer function of the automatic gain control means and the transfer function of the echo cancelling means are well known.

As can be seen in this figure, this device comprises a sound acquisition system 10 and a sound reproduction system 12, respectively comprising a microphone 14 associated with an analogue-digital converter (not shown) and loudspeaker 16 associated with a digital-analogue converter DAC (not shown).

As regards the digital processing of the signals, this is carried out by an automatic gain control module 18 driving a multiplier 20, to which a multiplication coefficient is delivered so as to attenuate the level of the received signal if it is too high and, conversely, to amplify the signal if its level is too weak in order to keep the level of the output signal constant over the working range of the device.

The digital processing of the signals furthermore uses echo cancelling means 22, consisting of a digital filter which essentially calculates an estimate of the echo. A subtracter 24 subtracts the estimated echo from the received signal.

The automatic gain control means in the exemplary embodiment described with reference to FIG. 1, which makes it possible to apply an amplification or attenuation coefficient G to the received signal, is placed upstream of the echo cancelling module.

Figure 2:
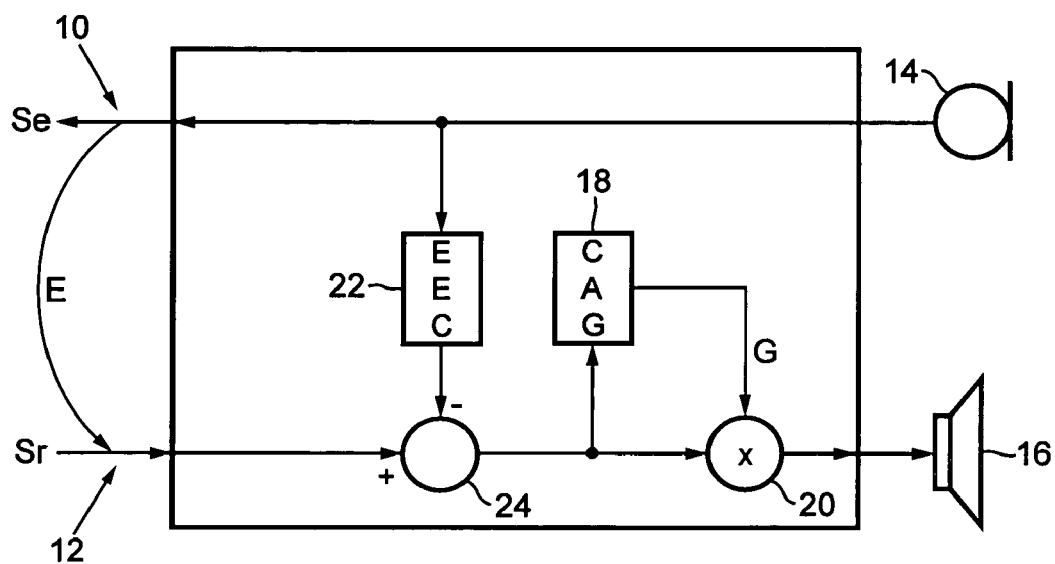
FIG. 2 illustrates another exemplary embodiment of a known device for processing audio signals, according to a second embodiment.

In the embodiment illustrated in FIG. 2, conversely, the automatic gain control module 18 is arranged downstream of the echo cancelling module 22.

As indicated above, these two embodiments lead to a certain number of major drawbacks, associated either with the presence of a nonlinear function upstream of the echo cancelling module, with a risk of amplifying the echo, or conversely of attenuating the signal from the remote equipment and driving the automatic gain control module both with the remote signal and with the echo, or to the presence of a nonlinear function upstream of the automatic gain control module and to the impossibility of attenuating the echo when the automatic gain control module is arranged downstream of the echo cancelling module.

Figure 3:
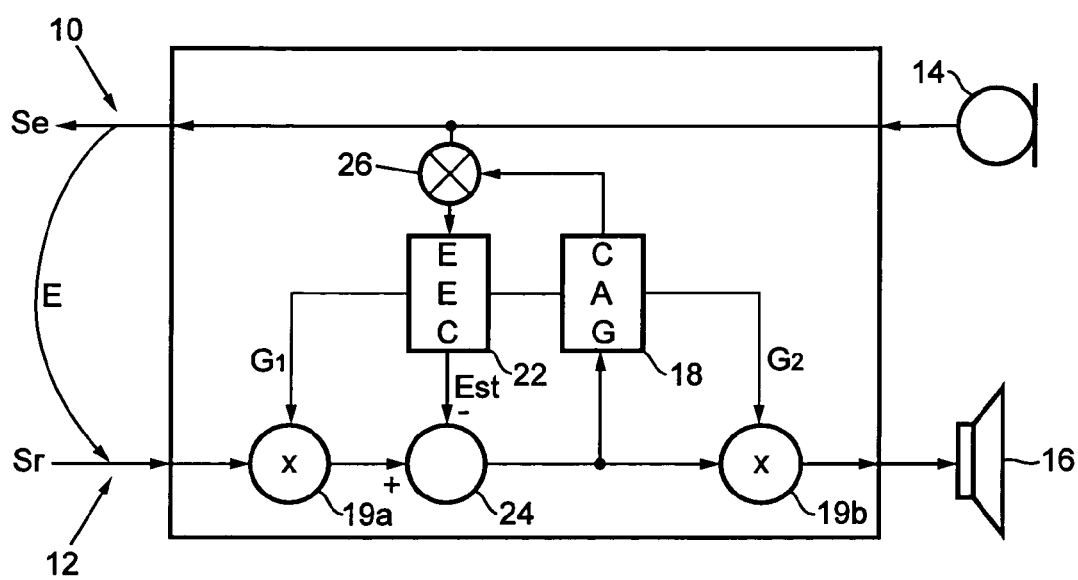
FIG. 3 illustrates the embodiment of a device according to the invention for digitally processing an audio signal.

FIG. 3 represents the architecture of a device for processing audio signals for telecommunication equipment, which makes it possible to overcome these drawbacks.

In this figure, the elements which are identical to those in FIGS. 1 and 2 bear the same numerical references.

This figure thus shows the sound acquisition system 10 and the sound reproduction system 12, which respectively comprise a microphone 14 associated with an analogue-digital converter ADC (not shown) and a loudspeaker 16 associated with a digital-analogue converter DAC (not shown). The digital processing of the audio signals uses an automatic gain control module 18 and an echo cancelling module 22. Depending on the application envisaged, the echo cancelling module constitutes either an electrical echo cancelling module EEC or an acoustic echo cancelling module AEC.

The automatic gain control module 18 takes measurements of the energy of the received signal $S_r$ coming from remote equipment and makes a comparison of the measured energy with a threshold value, in order to amplify or conversely attenuate the signal $S_r$ as a function of its level.

For its part, the echo cancelling module 22 consists of a digital filter which calculates an estimate of the echo from a reference signal consisting of the signal $S_e$ emitted by the microphone 14. The coefficients of this filter are calculated so as to minimize the error between the echo and the estimate of the echo. These coefficients are calculated recurrently on the basis of coefficients calculated beforehand, the error "error" between the estimate of the echo and the echo, the reference signal ref and an adaptive increment μ based on the following relationship:

Coefficient $(n+1)$=coefficient $(n)$+μ×error×ref

The echo estimate Est is then subtracted from the received signal Sr by means of a subtracter 24.

As can be seen in FIG. 3, the automatic gain control module 18 acts either upstream of the echo cancelling module or downstream of it, as a function of the behaviour to be obtained.

The device in fact comprises a first multiplier 19a placed upstream of the subtracter 24, and therefore upstream of the echo cancelling module 22, and a second multiplier 19-b placed downstream of the subtracter 24.

During operation, in a manner known per se, the automatic gain control module 18 forms an overall coefficient G for amplification or attenuation of the signal by comparing the energy of the received signal with the minimum and maximum thresholds, one corresponding to attenuation of the received signal and the other to amplification of the received signal.

If the energy of the received signal is less than the minimum threshold value, then the coefficient G corresponds to an amplification coefficient of the signal. Conversely, if the energy of the signal is more than the maximum threshold value, then the overall amplification coefficient G corresponds to an attenuation coefficient.

An attenuation coefficient G1 and an amplification coefficient G2 for the received signal are respectively applied to the multipliers 19-a and 19-b respectively arranged upstream and downstream of the subtracter. Thus, if the automatic gain control device has to amplify the received signal, i.e. if the overall coefficient G is more than 1, then G1=1 and G2=G. The coefficient G1 applied to the first multiplier 19-a is then equal to the value unity and the coefficient G2 applied to the second multiplier 19-b is equal to G. The amplification is then located after the echo cancelling module 22. This avoids any risk of amplifying the echo.

In the event that the automatic gain control module 18 has to attenuate the received signal, i.e. if the overall coefficient G is less than 1, then G1=G and G2=1.

The coefficient G1 is then equal to the overall coefficient G and the coefficient G2 is then equal to the value unity. The attenuation is then applied before the echo cancelling module 22, which makes it possible to attenuate the echo if need be.

As can be seen, depending on whether the processing carried out by the automatic gain control module takes place upstream or downstream of the processing carried out by the echo cancelling module, the invention makes it possible to avoid amplifying the electrical or acoustic echo upstream of the echo cancelling module, when the automatic gain control module has to amplify the received signal, to reduce the echo when the received signal is strong, by then acting upstream of the echo cancelling module, and to use the received signal alone as the input signal of the automatic gain control module.

It can be therefore seen that this arrangement makes it possible to combine the advantages of both embodiments of the prior art, without tolerating the major drawbacks.

Lastly, it will be noted that the invention is not limited to the embodiment which has been described.

Indeed, as represented in FIG. 3, with a view to resolving the problems associated with the joint use of an echo canceller and an automatic gain control device, the input signal of the echo cancelling module i.e. the emitted signal $S_e$ is attenuated by quantity corresponding to the attenuation generated in the received signal. In order to do this, a multiplier 26 is used to apply the transfer function of the automatic gain control means to the input of the echo cancelling device, so that a signal coming from the microphone and the received signal are each manipulated by a function comprising the same term corresponding to the transfer function of the automatic gain control means.

As can be seen, applying the AGC transfer function to the input of the echo cancelling device 29 makes it possible to obtain a factorizable AGC term in each of the equations defining the echo and the echo estimate.

In fact, minimizing the mean square error between the echo Echo (t) and the echo estimate Estimate(t) equates to minimizing the following quantity:

$$\text{Error}(t) = \text{Echo}(t) - \text{Estimate}(t)$$

Or:

$$\text{Error}(t) = [\text{Ref}(t) \times H(t)] \times AGC(t) - [\text{Ref}(t) \times AGC(t)] \times H_{est}(t)$$

Where:
$H(t)$ denotes the transfer function of the echo between the loudspeaker and the microphone; and
$H_{est}(t)$ denotes the transfer function of the echo estimate.
With a steady-state assumption for the transmission channel, the convolution product is associative. The above formula then becomes:

$$\text{Error}(t) = \text{Ref}(t) \times [H(t) - H_{est}(t)] \times AGC(t)$$

The invention claimed is:

1. A device for processing audio signals for telecommunication equipment, comprising:
    automatic gain control means configured for:
        calculating an overall coefficient as a function of a level of a received audio signal, and;
        acting on the level of the received audio signal by amplifying and attenuating said received audio signal according to said coefficient;
    the device further comprising:
        echo cancelling means;
        the automatic gain control means comprising:
            amplification means acting downstream of said echo cancelling means; and
            attenuation means acting upstream of said echo cancelling means, the amplification and attenuation means for separately amplifying and attenuating the received audio signal with respect to the propagation direction of the received audio signal, and
        said automatic gain control means further being configured for:
            controlling the amplification means for applying the overall coefficient when said coefficient is an amplification coefficient; and
            controlling the attenuation means for applying the overall coefficient, when said coefficient is an attenuation coefficient.

2. The device according to claim 1, wherein the amplification means and the attenuation means each comprise a multiplier respectively placed downstream and upstream of the echo cancelling means and receiving the amplification coefficient and the attenuation coefficient as input, respectively.

3. The device according to claim 1, wherein it comprises means for attenuating the transmitted signal by a level corresponding to the attenuation generated in the received signal by the attenuation means.

4. The device according to claim 1, wherein the echo cancelling means comprise means for estimating the echo and means for subtracting the estimated echo from the received signal.

5. A telecommunications set, including a device for processing acoustic signals according to the method of claim 1.

6. A method for processing an audio signal for telecommunication equipment comprising:
    receiving an audio signal
    calculating an overall coefficient as a function of a level of the received audio signal;

acting on the level of the received audio signal according to the overall coefficient using amplification means acting downstream of echo cancellation means of the equipment and attenuation means acting upstream of the echo cancellation means which separately amplify and attenuate the received audio signal, with respect to the propagation direction of the received audio signal by:

controlling the amplification means for applying the overall coefficient, when said coefficient is an amplification coefficient; and controlling the attenuation means for applying the overall coefficient, when said coefficient is an attenuation coefficient;

the method further comprising:

cancelling echo in the received signal.

7. A method according to claim 6, wherein the level of a transmitted audio signal is furthermore attenuated by a level corresponding to the attenuation level of the signal before the echo cancelling.

* * * * *